United States Patent [19]
McMurtrie

[11] 3,982,434
[45] Sept. 28, 1976

[54] FLUID FLOW SIGNAL PROCESSING CIRCUIT

[75] Inventor: Charles Louis McMurtrie, North Plainfield, N.J.

[73] Assignee: Eastech, Inc., Edison, N.J.

[22] Filed: Mar. 14, 1975

[21] Appl. No.: 558,280

[52] U.S. Cl. .................... 73/194 VS; 307/235 A; 328/163; 328/165
[51] Int. Cl.² .................... G01F 1/32; H03B 1/04; H04B 15/00
[58] Field of Search ...... 73/194 B; 307/233, 235 A; 328/117, 163, 165, 167; 324/103 P

[56] References Cited
UNITED STATES PATENTS

| | | | |
|---|---|---|---|
| 2,986,655 | 5/1961 | Wiseman et al. | 324/103 |
| 2,996,613 | 8/1961 | Glomb | 328/117 |
| 3,398,373 | 8/1968 | Caswell | 307/235 |
| 3,535,927 | 10/1970 | Mahon et al. | 73/194 |
| 3,852,617 | 12/1974 | Vidovic | 307/235 |
| 3,854,334 | 12/1974 | Herzl | 73/194 |

*Primary Examiner*—Herbert Goldstein
*Attorney, Agent, or Firm*—Frederick W. Padden

[57] ABSTRACT

A fluid mechanical arrangement of a bluff body flowmeter in a pipe line is disclosed with a thermal sensor arrangement for sensing flow signals in that pipe and with a method and circuit for processing the sensed signals to subtract low frequency fluid noise signal that accompany sensed signal and extracting sensed signals related to the fluid flow rate through the pipe. Signal processing is achieved through a circuit comprising an inverting amplifier, peak detector, summing amplifier and trigger amplifier. The detector senses positive and negative peaks of the thermal sensed flow signals and produces signals the frequency of which corresponds to the flow rate of fluid through the pipe. The detector also generates negative and positive peak indicating signals and stores them in combination with an output image of the thermistor sensed fluid flow signal. The inverting amplifier inverts the thermal sensed signal for driving the peak detector. The summing amplifier sums the thermal sensed signal with the signals stored by the peak detector and produces a resultant output signal which has a frequency corresponding to the flow rate through the pipe and which substantially excludes any component of the low frequency noise. The trigger amplifier converts the summing amplifier output signals into trigger pulses for a utilization means.

20 Claims, 10 Drawing Figures

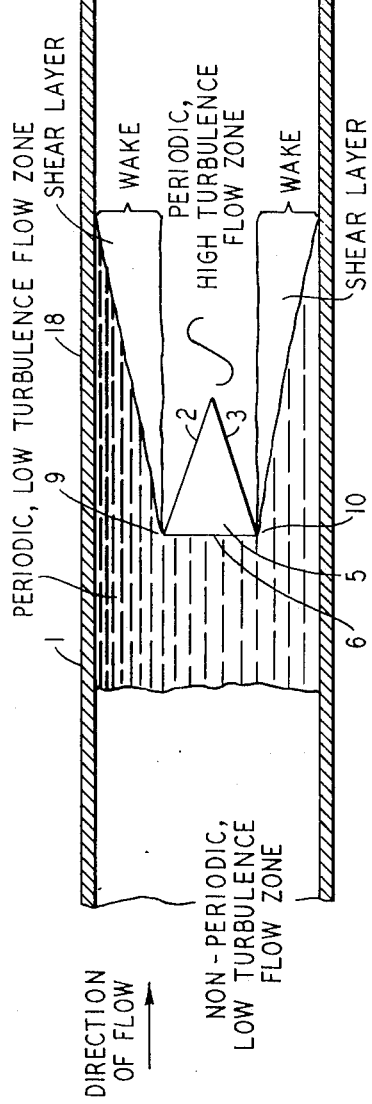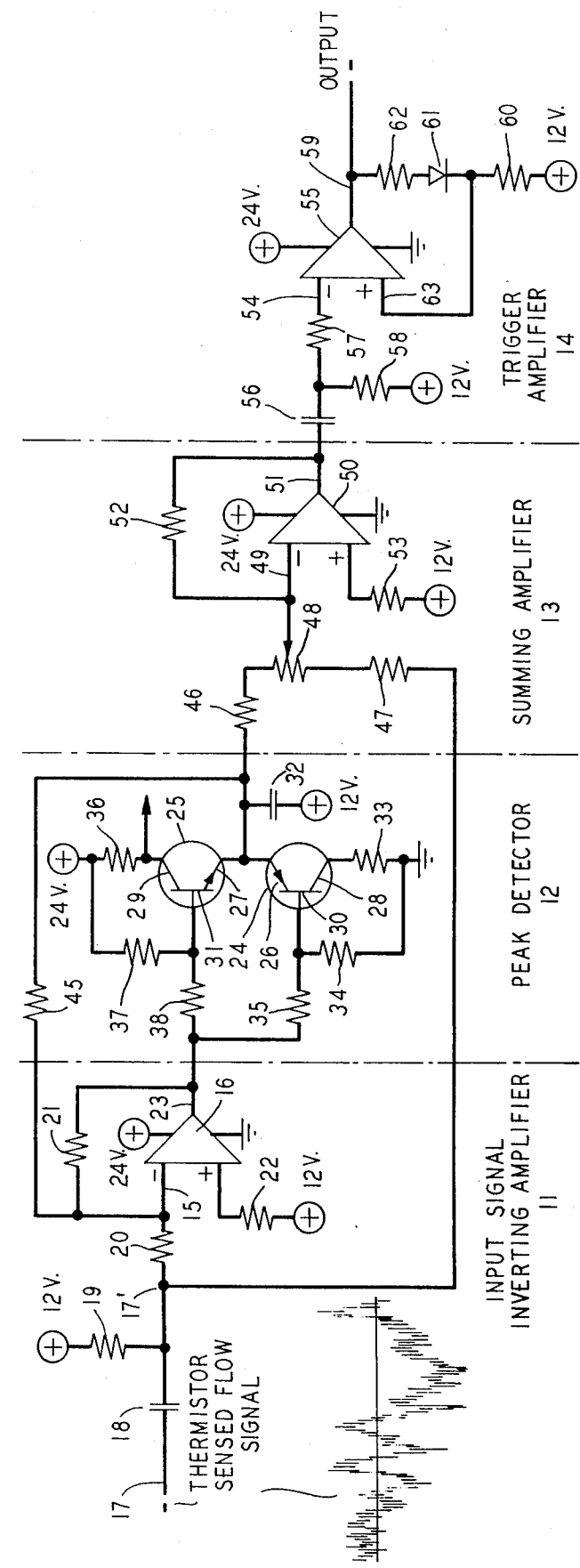
FIG. 1 (PRIOR ART)
FIG. 2

AMPLIFIER 16
INPUT SIGNAL

AMPLIFIER 16
OUTPUT SIGNAL

EMITTER-CAPACITOR
SIGNAL

EMITTER-CAPACITOR
SIGNAL
(EXPANDED TIME BASE)

EMITTER-CAPACITOR
SIGNAL (TOP)
AMPLIFIER 16
OUTPUT SIGNAL
(BOTTOM)

AMPLIFIER 50
OUTPUT SIGNAL

AMPLIFIER 16
INPUT SIGNAL (TOP)
AMPLIFIER 55
OUTPUT SIGNAL
(BOTTOM)

FLUID FLOW SIGNAL PROCESSING CIRCUIT

BACKGROUND OF THE INVENTION

This invention relates to a signal processing system and particularly to a method and a circuit suitable for use in a flowmeter to process composite fluid flow signals which are sensed in a pipeline conduit by a flow sensor having a nonlinear frequency response. The invention is specifically useful with nonlinear thermal sensors without frequency compensation and for producing signals corresponding to the fluid flow rate through the conduit.

Prior art fluid dynamic flowmeters often use thermal sensors, such as heated thermistors, hot wires, hot film and semiconductor materials, to sense perturbations in a fluid flow about a bluff body in a pipeline. Ordinarily, the sensor is electrically heated to a temperature elevated above that of the fluid in the pipe. Flow signals are then sensed by the cooling and reheating of the sensor under control fluid velocity variations or vortex shedding phenomena about the bluff body in the pipe.

A recognized deficiency of such thermal sensors is that they have relatively poor thermal frequency response and, as a consequence, the signal amplitudes which they produce at higher frequencies are less than those produced at lower frequencies. The nonlinear amplitude-frequency response of thermal type sensors has long been known and illustratively is treated in "Thermistors, Their Theory, Manufacture and Application" published Jan. 1960 by the Institution of Electrical Engineers, R. W. A. Scarr and R. A. Setterington and the articles cited in the bibliography of that publication.

In view of the nonlinear characteristics of thermal sensors, the prior art has utilized circuitry for linearizing or compensating for the disparities in the thermal response over operating frequency ranges of interest. Such circuitry is disclosed, for example, in R. F. Mahon-C. L. McMurtrie U.S. Pat. No. 3,535,927 issued Oct. 27, 1970. It functions to equalize the amplitude of undesired low frequency fluid flow rate noise signals with desired higher frequency fluid flow rate signals both of which are sensed by the thermal sensor.

A problem in such linearizing or compensating arrangements is that the frequency response characteristic of the thermal sensor is a strong function of the fluid media in which it is immersed. Thus, to achieve good linearization or compensation the sensing arrangement would need to be tested in the fluid in which it would operate and the compensation or linearization tailored for that arrangement. If an appropriate linearization is used to cover most liquid media, then the quality of the signal generated by such an arrangement may be sufficiently degraded as to limit the dynamic flow range that could be handled without errors.

It is therefore apparent that a need exists for a technical advance which aids in reducing the necessity of linearization or frequency compensating arrangements for thermal sensor in flowmeter equipment and provides alternatives to thermal frequency compensation techniques.

SUMMARY OF THE INVENTION

A solution to the foregoing problem and deficiency is achieved by a technical advance as set forth in specific exemplary embodiments of this invention which process flow signals sensed by a thermal sensor in a pipeline and derives therefrom accurate flow rate signals without a need for thermal frequency compensating arrangements. The exemplary embodiments enable a universal sensor technique to be used in many fluid media and over wide ranges of fluid flow with minimal error in measured flow rate signal and advantageously without a necessity of individual tailoring of a frequency compensation network for each such media.

The exemplary process involves inverting the phase of a received thermal sensed signal which comprises high amplitude noise and lower amplitude signals related to the flow rate of fluid through a pipe conduit. Next, the negative and positive peaks of the inverted signal are detected and signals therefor stored together with the inverted signal. The stored signals are then summed with the received thermal sensed signal substantially to cancel the high amplitude noise and, advantageously, to extract a resultant output signal whose frequency is related to the fluid flow rate through the pipe.

The illustrative embodiment includes circuitry for processing the thermal sensed flow signals. It comprises an inverting amplifier, peak detector, summing amplifier and trigger amplifier and for cancelling undesired low frequency noise of a thermal sensed flow signal while producing trigger pulses corresponding to the flow rate of fluid through a pipe. The inverting amplifier receives the thermal sensed flow signal and inverts its phase 180° at its amplifier output. The detector responds to negative and positive peaks of the inverted signal and, advantageously, stores peak indicating signals and the inverted signal. The summing amplifier combines the stored signals and the thermal sensed signal (which is 180° out-of-phase with respect to the stored signal) for deriving a difference signal whose frequency is related to the flow rate of fluid through the pipe. Subsequently, the latter signals are applied to the trigger amplifier for producing fluid flow rate pulse signals for driving a utilization means.

It is a feature of this invention that the inverting amplifier circuit includes an operational amplifier having at least one input which receives the thermal sensed fluid flow signal via a coupling network including a capacitor-resistor arrangement.

Another feature is that an inverted fluid flow signal is produced at an output of the inverting operational amplifier and is direct coupled to a peak detector circuit which detects negative and positive peaks of the inverted flow signal and generates corresponding peak indicating signals which are provided at a detector output together with the inverted fluid flow signal.

A further feature is that the peak detector comprises a pair of oppositely conductive type transistors each of which comprises emitter, base and collector electrodes. Advantageously, each such emitter is connected together and to one plate terminal of a storage capacitor, a second plate terminal of which is connected to a first source of potential. A collector of a first one of the transistors is also connectable to a second source of potential. A collector of a second one of the transistors is connectable to a third source of potential. Each of the base electrodes of the transistors is connected to the output of the inverting operational amplifier via a resistor network.

Another feature is that the transistors are responsive to a received flow signal for storing on the capacitor signals indicating negative and positive peaks of the received flow signals.

It is another feature that each of the collector electrodes of the peak detector transistors is connected in series with an individual resistor to the respective sources of direct current potential. Advantageously, the voltages developed across these resistors correspond to the conduction of the transistors under control of the received thermal sensed flow signal and the negative and positive peak indicating signals. The frequency of each such transistor conduction is directly related to the flow rate of the fluid flow through the pipe. Another advantage of using the collector resistor arrangement is that it is an alternative to the signal processing through the summing amplifier circuitry.

Another feature is the provision of a summing amplifier circuit which comprises an operational amplifier having at least one input for illustratively receiving a summation of the thermal sensed flow signal and the signals stored in the peak detector. According to a specific aspect of this invention, the signal summation is achieved by a resistor scaling network which is connectable to the input of inverting operational amplifier for receiving the noninverted thermistor sensed signal and to the storage capacitor of the peak detector circuit.

Yet another feature of this invention is that the trigger amplifier comprises an operational amplifier having an input coupled to an output of the summing operational amplifier and for converting its output signal into trigger pulses the frequency of which corresponds to the flow rate of the fluid flow through the pipe.

DRAWING DESCRIPTION

The foregoing and other features and advantages of this invention may easily be understood from the following more detailed description of a specific exemplary embodiment thereof as set forth in the drawing in which:

FIG. 1 shows the flow zones created by a bluff body in a conduit;

FIG. 2 is a schematic drawing of the illustrative circuitry for processing flow signals sensed in the conduit to extract signals related to the flow rate through that conduit;

DETAILED DESCRIPTION

Figure 3:
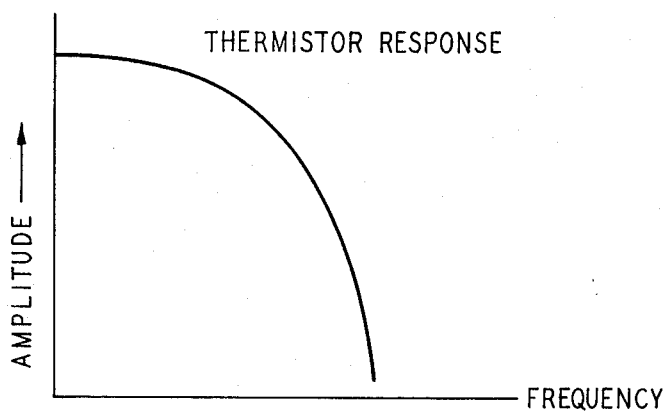
FIG. 3 is an amplitude-frequency response curve of a thermal sensor.

Before discussing the invention, it is deemed helpful to review the manner in which a bluff body interacts with fluid flowing in a conduit. As shown in FIG. 1, a bluff body 5 illustratively having a triangular cross-section is mounted along a diameter of pipe 1 and between inner walls thereof. A facing, or base, surface 6 of body 5 is disposed preferably normal to the directon of fluid flow in conduit 1 and for interacting with that fluid flow to produce an oscillating wake; i.e., that region bounded by and including the shear layers which separate the periodic, high turbulence flow zone behind the body 5 from the periodic, low turbulence flow zone outside thereof. The wake zone commences proximate the sharp edged corners 9 and 10 of body 5 and spreads downstream from body 5 until it fills the entire pipe 1. In the upstream direction from body 5, the signals detectable in front of body 5 get progressively weaker upstream and become almost completely buried in the turbulent flow fluctuations at approximately one bluff body length upstream from body 5.

To achieve nonintermittency in the oscillating fluid flow, A. E. Rodely U.S. Pat. No. 3,572,117 issued Mar. 23, 1971, teaches that the ratio of the axial length of body 5 to the height of base 6 is advantageously between 1 and 2, and the ratio of the height of base 6 to the inner diameter of pipe 1 is advantageously between 0.15 and 0.4. Moreover, a dimensional length between a frontmost surface of base 6 to its sharp corner edges 9 and 10 with respect to that of the height of the base is of a ratio of 0.3 or less.

Flow signals within pipe 1 may be sensed with a number of prior art sensors. Illustratively, the aforementioned Rodely patent discloses a probe-like sensor, such as a thermistor sensor, typically mounted in the pipe wall at location 18 of FIG. 1 and electrically heated for flow signal sensing in the periodic, low turbulence flow zone outside of the wake. In the C. L. McMurtrie-A. E. Rodely U.S. Pat. No. 3,587,312 issued June 28, 1971, flow signals are sensed by a pair of differential sensors integrally mounted in the upstream facing surface of base 6 of body 5. T. J. Fussel, Jr. U.S. Pat. No. 3,732,731 issued May 15, 1973 discloses a removable thermistor sensor arrangement in which the thermistor communicates with the flow signals through a first aperture in the downstream surfaces 2 and 3 of body 5 and via a second aperture communicating between the first aperture and an exterior of the pipe 1.

For over two decades, it has been known that a thermistor has nonlinear frequency response, that is, it exhibits a declining output amplitude or voltage characteristic for increases in frequency in a manner as illustrated in FIG. 3. As a consequence, circuitry is often associated with a thermistor sensor to electrically compensate for its nonlinearity and provide a substantially flat or uniform amplitude-frequency characteristic. Such compensated thermistor circuitry is disclosed, for example, in the aforementioned Mahon et al U.S. Pat. No. 3,535,927.

The exemplary embodiment of the present invention as depicted in FIG. 2 eliminates the need for equipping a thermistor or other type of thermal sensor with linearizing, or frequency compensating, circuitry. Advantageously, the circuitry of FIG. 2 illustratively processes signals which are sensed in the fluid flow through pipe 1 by a non-frequency compensated prior art thermistor and in that process extracts therefrom signals indicative of the flow rate of that fluid through pipe 1.

In FIG. 2, the fundamental building blocks of the circuitry comprise an input signal inverting amplifier 11, a peak detector 12, a summing amplifier 13, and a trigger amplifier 14. The amplifier 11 functions to invert its input signal by 180° for activating the peak detector 12. The latter operates to detect and store negative and positive peak excursions of the low amplitude fluid flow rate signals which are superimposed on higher amplitude fluid noise signals. Both the low and high amplitude signals are a composite signal sensed by the thermistor or thermal sensor. Amplifier 13 combines the signals received from the peak detector 12 with the 180° out-of-phase signals from an input 17' for producing a resultant output signal which corresponds to the negative and positive peak signals stored by detector 12 and which is of the same frequency as the low amplitude fluid flow rate signal portion of the thermistor sensed fluid signal. The resultant output signals drive the amplifier 14 to generate trigger signals related to the flowrate of fluid through conduit 1.

Figure 4:
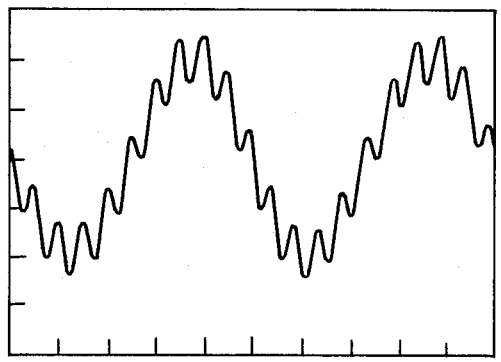
FIGS. 4 through 10 depict signal waveforms at various points in the circuitry of FIG. 2.
Figure 5:
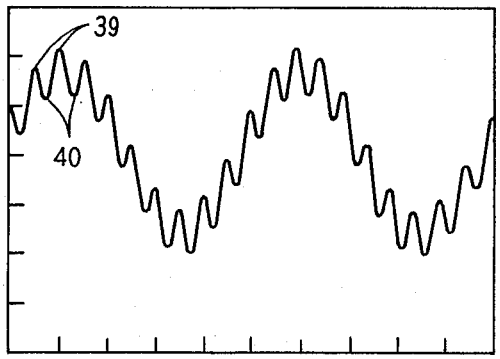

In FIG. 2, a thermistor sensed flow signal enters the exemplary circuitry at its input 17 and is coupled to the input 15 of amplifier 16 via a coupling network comprising capacitor 18 and resistors 19 and 20. Resistors 21 and 22 are utilized for bias and gain control of amplifier 16 in a known manner. The gain is linear over the frequency range of interest and is essentially controllable by the ratio of resistor 21/20. By way of example, an idealized composite signal at the input 17' of amplifier 16 is shown in FIG. 4. It shows a low amplitude, high frequency fluid flow signal superimposed on a high amplitude, random noise signal of lower frequency and which noise signal is not of interest. FIG. 5 depicts the amplified and inverted composite signal appearing at the output 23 of amplifier 16.

Peak detector 12 comprises PNP and NPN transistors 24 and 25 comprising emitters 26, 27, collectors 28, 29 and base electrodes 30, 31. The biasing of transistors 24 and 25 is as follows: the emitters 26 and 27 are wired together and are advantageously connected to one terminal of a capacitor 32. A second terminal of capacitor is connected illustratively to +12 volts. Capacitor 32 is illustratively charged to the negative and positive peaks of the composite signal at the output 23 as hereafter described. Collector 28 of transistor 24 is illustratively connected to ground potential via a resistor 33. Base 30 of transistor 24 is connected via a resistor 34 to ground potential and via resistor 35 to the output 23. The collector 29 of transistor 25 is connected via resistor 36 illustratively to +24 volts. Base 31 is connected via a resistor 37 illustratively to +24 volts and via resistor 38 to output 23.

The foregoing bias conditions of transistors 24 and 25 enable their emitter-base and collector-emitter junctions to be dynamically forward and reverse biased for charging and discharging capacitor 32 in response to signals at the output 23. Transistors 24 and 25 also function as rectifiers that allow capacitor 32 to assume and hold charge voltages corresponding to the negative and positive peaks of the signals at output 23. It is these held charge voltages which are processed through the summing and trigger amplifiers as later explained to provide trigger pulse signals corresponding to the rate of fluid through pipe 1.

Capacitor 32 is charged to positive peak indicating voltages corresponding to the positive peak voltages 39 of the signal (FIG. 5) at output 23 when transistor 25 is forward biased and transistor 24 is reverse biased as a result of the signal at output 23. Conversely, capacitor 32 is charged to negative peak indicating voltages corresponding to the peak voltages 40 of the signal (FIG. 5) at output 23 when transistor 24 is forward biased and transistor 25 is reverse biased by the signal at output 23.

Transistor 25 is forward biased when the signal applied from output 23 to base 31 via resistor 38 is sufficiently more positive than the voltage at emitter 27 and hence capacitor 32 to cause transistor 25 to conduct. During that forward bias, current flows through the emitter 27-base 31 junction and hence through the emitter 27-collector 29 junction and via resistor 36 and +24 volts for charging capacitor 32 in a positive direction. The current continues to flow and illustratively increases for charging capacitor 32 until a positive peak 39 of the signal (FIG. 5) is attained. The charge voltage on capacitor 32 will cease to charge when the base 31-emitter 27 voltage becomes sufficiently low or reversed biased and transistor 25 is thereby rendered nonconductive to arrest temporarily further charging action on capacitor 32. The latter thereafter retains the positive peak indicating voltage to which it is charged during the conduction of transistor 25 and, in the illustrative embodiment, until transistor 24 is subsequently forward biased. During the aforenoted forward bias of transistor 25, transistor 24 is held reverse biased due to the difference between the signal voltage applied from output 23 via resistor 35 to base 30 and the voltage across capacitor 32.

Transistor 24 is forward biased when the signal applied from output 23 to base 30 via resistor 35 becomes sufficiently more negative than the voltage at emitter 26 and hence capacitor 32. Following the aforementioned forward biasing of transistor 25 and charging capacitor 32, transistor 24 does not immediately conduct and discharge capacitor 32 to follow the signal transition from the peak signal 39 (FIG. 5) at the output 23. This is due to the peak indicating voltage charge retained on capacitor 32 and the voltage at output 23 as well as the base 30-emitter 26 forward bias parameters. When the signal at base 30 is sufficiently negative to forward bias transistor 24, current flows through the emitter 26-base 30 junction and hence through the emitter 26-collector 28 junction and via resistor 33 to ground potential for altering the charge of capacitor 32 in the negative direction. The current continues to flow and illustratively to alter the charging of capacitor 32 until a negative peak 40 of the signal (FIG. 5) at output 23 is attained and a change occurs from that peak toward a succeeding positive peak. When such a change occurs, the base 30-emitter 26 becomes sufficiently low or reversed biased and transistor 24 is thus rendered nonconductive to arrest temporarily further charging action on capacitor 32. The latter thereafter retains the negative peak indicating voltage to which it charged during the conduction of transistor 24 and, in the illustrative embodiment, until transistor 25 is subsequently forward biased. During the foregoing forward bias of transistor 24, transistor 25 is held reverse biased due to the difference between the signal voltage applied from output 23 via resistor 38 to base 31 and the voltage across capacitor 32.

Figure 6:
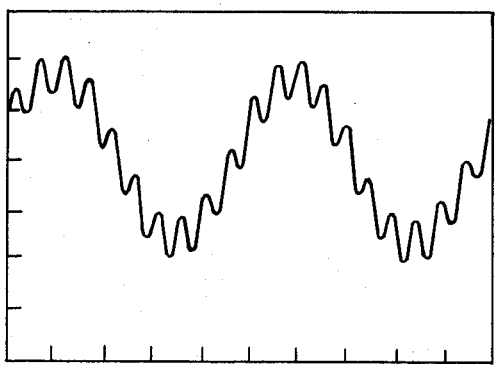
Figure 7:
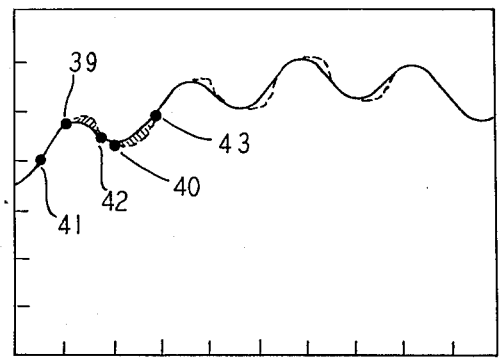

FIG. 6 illustrates the voltage waveform derived across capacitor 32 as a result of the positive and negative peak detection of the signal at output 23. The waveform of FIG. 6 appears to be essentially the same as the waveform of FIG. 5 (output 23) when they are both represented on the same time base; however, the waveforms actually differ. FIG. 7 depicts on an expanded time base the waveforms of the charge signal voltage across capacitor 32 in dashed line waveform of the signal at output 23 in solid line, and the differing portion between the two signals by the shaded segment of the waveforms. FIG. 7 illustrates at point 41 that the charge voltage of capacitor 32 follows the signal at output 23 until transistor 25 is no longer forward biased and at which time the positive peak indicating signal 39 is stored on capacitor 32 until a point 42 is achieved. From peak 39 to point 42, the exemplary signal at output 23 and the voltage on capacitor 32 are not congruent because capacitor 32 is substantially precluded from changing its charge due to the concurrent reverse biased conditions of transistors 24 and 25. As the signal voltage at output 23 reaches point 42 and continues toward the negative peak 40, a voltage difference then exists at the base 30 -emitter 26 junction for both causing the forward bias conduction of transistor 24 and the tracking of the waveforms for the signals of output 23 and capacitor 32 until the negative peak 40 is reached. From points 40 to 43, the voltage difference between base 30 -emitter 26 illustratively reverse biases transistor 24 and the exemplary signal at output 23 and the voltage on capacitor 32 are not congruent because capacitor 32 is substantially precluded from changing its charge due to the reverse bias of transistors 24 and 25. Thus, the positive and negative peak indicating voltages retained on capacitor 32 as shown by the shaded area between the waveforms of capacitor 32 and output 23 provide, as later described, a means for generating trigger signals corresponding to the flow rate of fluid through the pipe 1.

Figure 8:
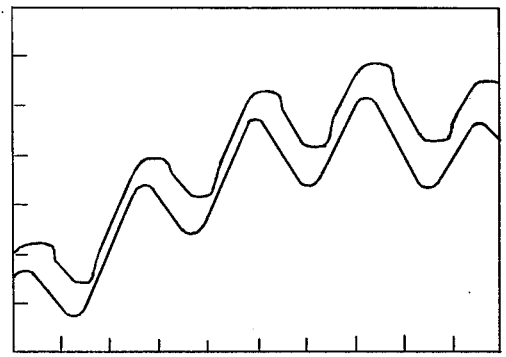

FIG. 8 further illustrates on the same time base the differences in the signal waveforms across capacitor 32 and at output 23 with the topmost waveform indicating the capacitor 32 signal and the lower waveform the signal at output 23.

Figure 9:
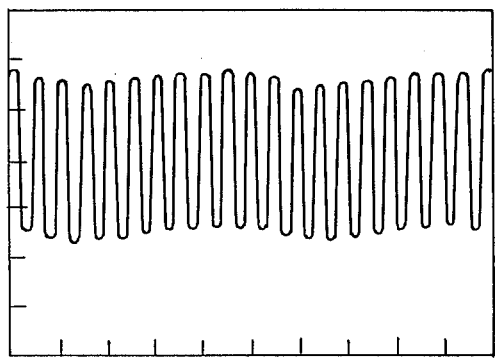

Further processing of the signal voltage across capacitor 32 is achieved in the summing amplifier circuit 13 to derive signals for driving the trigger amplifier 14. Specifically, the voltage of capacitor 32 is summed with the thermistor sensed flow signals of input 17 through scaling resistors 46 and 47 and a potentiometer 48. These signals, which are essentially 180° out of phase with one another because of the inversion of amplifier 16, are summingly applied to an input 49 of an operational amplifier 50. Resultingly, the signal at an output 51 of amplifier 50 is the difference between the summed signals at input 49. The output voltage difference occurs as a consequence of the positive and negative peak indicating voltages stored on capacitor 32 as priorly explained and as indicated by the shaded areas between the waveforms of FIG. 7. Illustratively, the voltage difference produced at output 51 due to the signal processing by amplifier 11, detector 12 and summing amplifier is depicted by the waveform of FIG. 9. The frequency of the signal at output 51 is identical to the flowrate signal of interest with the low frequency noise. The signal processing through amplifier 11, detector 12 and summing amplifier 13 essentially cancels the noise at output 51. The bias and gain control of amplifier 50 are controlled by resistors 52 and 53 in a known manner.

Figure 10:
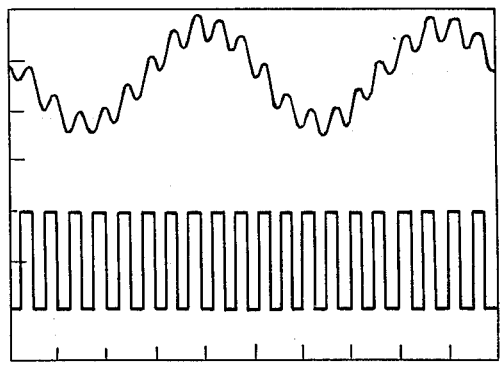

Finally, the signal at output 51 is AC coupled to an input 54 of an operational trigger amplifier 55 via a capacitor 56 and resistors 57 and 58. Amplifier 55 functions to provide high level wave pulse signals at its output 59 and whose pulse frequency is identical to that of the flow rate signal of interest and that forms the higher frequency component of the thermistor sensed flow signal present at input 17. FIG. 10 depicts the upper waveform the thermistor sensed flow signal at input 17 on the same time base as the pulse signal at output 59. To control the generation of the square wave pulses at output 59, another input 63 of amplifier 55 is connected via a resistor 60 to a +12 volt source and to the output via resistor 62 and diode 61. The diode only permits feedback to occur around amplifier 55 when its output is greater than 12 volts. In this arrangement, the triggering level is determined by the ratio of feedback resistors 62 and 60.

By way of example, the following resistor, capacitor, and amplifier component values have been found suitable for use in the exemplary signal processing circuitry:

TABLE OF COMPONENT VALUES

| COMPONENT | VALUE | |
|---|---|---|
| 18 | 23 | MF |
| 32 | .47 | MF |
| 56 | 1 | MF |
| 19 | 15 | K Ohms |
| 20 | 200 | K Ohms |
| 21 | 604 | K Ohms |
| 22 | 200 | K Ohms |
| 33 | 100 | Ohms |
| 34 | 15 | K Ohms |
| 35 | 301 | Ohms |
| 36 | 100 | Ohms |
| 37 | 15 | K Ohms |
| 38 | 301 | Ohms |
| 45 | 1 | Meg Ohm |
| 46 | 750 | K Ohms |
| 47 | 402 | K Ohms |
| 48 | 20 | K Ohms |
| 52 | 2 | Meg Ohms |
| 53 | 324 | K Ohms |
| 57 | 200 | K Ohms |
| 58 | 200 | K Ohms |
| 60 | 9.09 | K Ohms |
| 62 | 1 | Meg Ohm |
| 59 | 1N914 | |
| 16 | LM207 H operational amplifier National Semiconductor Corp. Santa, Clara, Calif. 95051 | |
| 50,51 | 741 HC operational amplifier Part No. U5B 7741393 Fairchild Semiconductor Div. of Fairchild Camera & Instrument Corp. Mountainview, Calif. 94040 | |
| 24 | 2N3906 | |
| 25 | 2N3904 | |

It is to be understood that the hereinbefore described arrangements are illustrative of the application of the principles of this invention. In light of this teaching, it is apparent that numerous other arrangements may be devised by those skilled in the art without departing from the spirit and scope of the invention. For example, it is within the inventive teaching to derive fluid flow rate signals across the resistors 33 and 36 at the collectors 26 and 29 which signals are generated by change of the conduction states of transistors 24 and 25. Each such change of state of either transistor occurs at a rate identical to the frequency of the flow signal of interest. Resistors 33 and 36 may be excluded from the circuit to reduce signal phasing differences. Moreover, the bluff body 5 of FIG. 1 may suitably be of any known configuration such as a right circular cylinder or rectangular. In addition, the transistors 24 and 25 may be replaced by semiconductors, such as diodes poled to correspond to the emitter-base electrodes 27, 31, and 26, 30.

What is claimed is:

1. For use with a fluid mechanical arrangement of a vortex shedding flowmeter comprising
   a conduit having walls defining a hollow inner chamber for containing a flowing fluid and said chamber having a longitudinal axis and an inner diameter dimension,
   a stationary bluff body positionable within said walls transverse to said longitudinal axis and spanning the entire diameter dimension,
   said body having triangularity in its shaped cross section, a base surface with a prescribed height dimension for facing upstream in a fluid flow through said chamber and side surfaces facing from said base surface downstream in said fluid flow, said height dimension of said base surface to said diameter dimension being a prescribed ratio, interaction of said base and side surfaces with said fluid flow producing an oscillating fluid flow of a frequency related to said flow rate, and sensor means responsive to said oscillating fluid flow for producing a composite signal comprising a first signal component having a frequency corresponding to said flow rate and at least one other signal component of lower frequency than the frequency of said first signal component and of amplitudes greater than amplitudes of said first signal component, the invention comprising means for inverting said composite signal, means for detecting peak amplitudes of the inverted composite signal and storing peak amplitude indicating signals in combination with said inverted signal, and means responsive to a receipt of said composite signal and the stored combination of said peak indicating and inverted signals for generating output signals the frequency of which is related to said first signal component and to the flow rate of fluid flow through said conduit.

2. For use in a fluid mechanical arrangement of claim 1 in which said sensor means comprises a thermal flow sensing means for producing said composite signal, the invention of claim 1 wherein, said inverting means comprises an inverting amplifier, said detecting and storing means comprises a peak detector and a storage capacitor, and said generating means comprises a summing amplifier.

3. The invention of claim 2 wherein said inverting amplifier includes an inverting operational amplifier and a resistor-capacitor network for coupling the composite fluid flow signal produced by said thermal sensing means to said operational amplifier for phase inversion.

4. The invention of claim 3 wherein said inverting operational amplifier comprises an output for supplying an inverted composite signal in response to said sensing means produced composite signal, and said peak detector comprises means responsive to each negative and positive amplitude peak of said first signal component in the supplied inverted signal at said amplifier output for storing on said storage capacitor said peak indicating signals in combination with said inverted composite signal.

5. The invention of claim 4 wherein said peak detector comprises a pair of oppositely conductive type transistors each of which comprises emitter, base and collector electrodes, the emitter electrodes being connected together and to said storage capacitor, a collector of a first one of said transistors being connectable to a first source of potential, a collector of a second one of said transistors being connectable to a second source of potential, a resistor arrangement, and each of said base electrodes of said transistors being connected to said inverting operational amplifier output through said resistor arrangement.

6. The invention of claim 5 wherein said peak detector further comprises resistor means connected in series with at least one collector electrode of said transistors for deriving electrical signals the frequency of which corresponds to prescribed conduction states said transistors and to the flow rate of fluid flow through said conduit.

7. The invention of claim 5 wherein said summing amplifier comprises means combining said composite signal produced by said thermistor sensing means and the combination of signal stored by said storage capacitor for generating output signals the frequency of which is related to said frequency of said first signal component and to the flow rate of fluid flow through said conduit.

8. The invention of claim 7 wherein said combining means comprises a resistor scaling network, an operational amplifier having at least one input connected through said resistor scaling network both to said storage capacitor and said emitter electrodes for receiving said combination of signals stored thereby and to an input of said inverting operational amplifier for receiving said composite signal produced by said thermal sensing means coupled thereto through said resistor-capacitor network and further having an output for providing a summed signal the frequency of which is related to said first signal component and to the flow rate of fluid flow through said conduit.

9. The invention of claim 8 further comprising a trigger amplifier responsive to a receipt of said summed signal for converting said summed signal into trigger pulses the frequency of which is related to the flow rate of said fluid flow through said conduit.

10. A method for processing an input composite signal having at least a first signal and at least one other signal of a lower frequency than said first signal and of an amplitude greater than amplitudes of said first signal and comprising inverting the phase of said composite signal, detecting peak amplitudes of said first signal in the inverted composite signal, storing detected peak amplitude indicating signals in combination with said inverted composite signal, and combining said input composite signal with the stored combination of said peak amplitude indicating signals of said inverted composite signal to produce an output signal of a frequency related to said first signal and of an amplitude greater than a said second signal component thereof.

11. A method in accordance with claim 10 further comprising the step of translating said output signal into trigger pulses of a frequency corresponding to said frequency of said first signal.

12. A circuit for processing an input composite signal having at least a first signal and a second signal of a lower frequency than said first signal and of an amplitude greater than amplitudes of said first signal and comprising means for detecting peak amplitudes of said first signal, means cooperating with said detecting means for storing peak indicating signals in combination with said composite signal, means for supplying said composite signal phase inverted, and summing means responsive to the supplied phase inverted composite signal and the stored combination of said peak indicating signals and said input composite signal for producing an output signal of a frequency related to said first signal and of an amplitude greater than any said second signal component thereof.

13. The invention of claim 12 further comprising an inverting amplifier responsive to a receipt of a said composite signal phase inverted for inverting the phase thereof to provide said input composite signal.

14. The invention of claim 13 wherein said summing means comprises a summing amplifier having at least one input terminal, scaling means for combining said supplied phase inverted composite signal and said stored composite of said peak indicating signals and said input composite signal, and said summing amplifier having an output terminal for producing said output signal.

15. The invention of claim 14 wherein said storing means comprises a capacitor, and
said detecting means comprises plural transistor circuitry.

16. The invention of claim 15 wherein said plural transistor circuitry comprises a pair of oppositely conductive type transistors each having emitter, base and collector electrodes, said capacitor having first and second plate terminals, said first terminal directly connected to each of said emitter electrodes, said second terminal connectable to a first source of potential, a collector electrode of a firt one of said transistors connectable to a second source of potential, a collector electrode of a second one of said transistors connectable to a third source of potential, resistor means biasing said transistors and connecting said input composite signal to each of said base electrodes.

17. The invention of claim 16 wherein said inverting amplifier comprises an input terminal for receiving said composite signal phase inverted, and said scaling means comprises a first resistor connectable to said inverting amplifier input terminal for deriving said phase inverted composite signal for said input terminal of said summing amplifier and another resistor connectable to said emitter electrodes of said transistors for deriving said stored combination of signals for said input terminal of said summing amplifier.

18. Thermal sensed fluid flow signal processing circuitry comprising means for receiving a thermal sensed flow signal and responsive to peak amplitudes of a said received thermal sensed fluid flow signal for altering at an output terminal the amplitude of said received signal to add peak amplitude indicating signals thereto, and a summing arrangement responsive to a receipt of the altered signal at said output terminal and to a receipt of said flow signal phase inverted for generating functional signals having a frequency related to flow rate of said sensed fluid flow.

19. The invention of claim 18 wherein said altering means comprises a pair of oppositely conductive type transistors each having base, collector and emitter electrodes, resistor means connecting said received thermistor flow signal to each of said base electrodes, a collector electrode of one of said transistors being connectable to a second source of potential, a capacitor connected between said second source of potential and each of said emitter electrodes.

20. The invention of claim 19 wherein said summing arrangement comprises a resistor connected to said emitter electrodes for deriving said altered signal and resistor means for combining said thermistor sensed fluid flow signal phase inverted with said derived altered signal to generate said functional signals.

* * * * *